United States Patent Office 3,178,390
Patented Apr. 13, 1965

3,178,390
AGGLUTINATION OF PIGMENTS AND POLYMERS
Richard S. Reed, Princeton, and Kenneth W. Nelson, Princeton Junction, N.J., assignors to Columbian Carbon Company, New York, N.Y., a corporation of Delaware
No Drawing. Filed May 9, 1962, Ser. No. 193,609
10 Claims. (Cl. 260—41.5)

This invention relates to the compounding of polymeric materials and pigments and provides an improved method of agglutinating pigments and natural or synthetic rubbers or like polymeric elastomers.

This invention is especially useful in the preparation of concentrated predispersions, or "masterbatches," of a compounding pigment, such as carbon black or silica, in a polymer base. The masterbatch may subsequently be further formulated with other compounding ingredients to make a variety of useful products.

It has long been the practice of the rubber industry to incorporate reinforcing pigments in rubber polymers by vigorous, high-shear milling in a suitable mixer, for instance a Banbury, until a uniform mixture is obtained. This process, generally termed "dry-mixing," since the rubber is dried prior to pigment incorporation therein, has proved costly due to its tremendous consumption of powder and, in most instances does not closely approach the ultimate degree of pigment dispersion possible.

Recently a process disclosed in the H. A. Braendle U.S. Patent 2,769,795, whereby the carbon black is dispersed in rubber in latex form, has found wide use in the preparation of carbon black-rubber masterbatches. While this is a particularly effective process, it is applicable only to those polymers which are obtainable in latex form. Also, in some instances, when synthetic rubber is produced in a polymerization system which does provide a latex phase, it is coagulated prior to shipment to the rubber compounder in order to avoid the excessive costs incurred in the transportation of latex.

Our present invention provides a highly effective process for incorporating particulate pigments in polymeric materials which avoids the disadvantages of dry-mixing yet does not require that th epolymer be used in latex form. The process has the further advantage of ready adaptability to continuous operation and requires less equipment than do alternate masterbatching techniques, whereby economic advantages are obtained both in apparatus cost, power requirement and attention of the operator. In addition to the foregoing advantages, we can obtain by our process reinforcing pigment-rubber masterbatches which, when vulcanized, have physical properties at least equal to, and in many cases far superior to, those obtained in vulcanizates prepared by conventional method.

In accordance with the present invention, we have discovered that pigment-polymer masterbatches, characterized by an excellent degree of pigment dispersion, may be economically prepared by processing the pigment with wet coagulated rubber or like polymer, hereinafter called "wet crumb," by the following cooperative steps in sequence:

(1) Pre-mixing wet polymer crumb particles, of the hereinafter specified size and moisture content, with the desired amount of pigment in such a manner as to obtain an over-all distribution of the pigment on the surfaces of the wet crumb particle;

(2) Mechanically compacting the pre-mix to uniformly fix the pigment distribution and to expel a portion of the moisture, by vaporization only, without loss of pigment or of water in liquid form;

(3) Masticating the resultant mixture from step 2 to further complete the dispersion and incorporation of the pigment in the polymer mass and causing occluded moisture to be brought to the surface of the mass, while preventing vaporization of the water or loss of water in liquid form, and extruding the moisture-containing masticated mass at a temperature sufficiently high to cause the contained moisture to vaporize as the masticated mixture passes from the extruder.

More specifically in reference to step 1, just noted, we have found that the size and drained moisture content of the wet polymer crumb particles are factors critical to the successful operation of the present masterbatching process, the permissible size and moisture content being dependent on the desired pigment loading, expressed as parts of pigment, by weight, per hundred parts of polymer, sometimes, for brevity, hereinafter referred to as "phr." (i.e., parts per 100 parts of rubber solids).

Crumb particle size, as referred to herein, is determined by screen analysis using standard screens of the Tyler standard sieve series. Although the wet crumb particles applicable to the present invention may exist in any shape, their largest dimension must be such that the particles are larger than 325 mesh but smaller than 2.5 mesh.

Generally, for a constant drained moisture content, the maximum permissible size of the crumb particles decreases as desired pigment loading increases. Thus, when a low pigment loading (i.e., 35 phr. or less) is desired, it is possible to use crumb particles of any size within the 2.5 to 325 mesh range. However, when the requirement is for a high pigment loading (i.e., 75–150 phr.), the maximum permissible crumb size lies within the range of 6 to 325 mesh. The maximum permissible dimensions of the wet polymer crumb for various pigment loadings are tabulated in the following Table 1:

TABLE 1

| Pigment loading (phr.): | Maximum permissible dimension of wet crumb (mesh number) |
|---|---|
| 25 | 2.5 |
| 50 | 3 |
| 75 | 6 |
| 100 | 8 |
| 125 | 9 |
| 150 | 10 |

We have also found that, regardless of its particle size, the polymer crumb subjected to this first step in our process should have a drained moisture content (i.e., moisture content of the crumb, determined by standard procedures, after passing the crumb over a shaker screen or the like to remove free water) within the range from about 10% to 65%, by weight. More specifically the drained moisture content of the crumb should be such as to give a pigment-wet polymer mix having a moisture content of at least 5% but not exceeding 50%, by weight. Preferably the moisture content of the mix should not exceed about 35%, by weight.

The pre-mixing of the polymer crumb with the pigment according to step 1, prior to mechanically processing the mix in steps 2 and 3, more fully described below, has been found to affect the adequacy of pigment dispersion in the final masterbatch product to a marked degree and is, therefore, an essential element of the invention. A rotating drum mixer provided with flights will accomplish the desired result although it will be apparent to one skilled in the art that any type of mixer which will effect an over-all distribution of pigment on the surface of the wet polymer crumb may be employed in this step. We have found that mixing time of about 15 minutes in a rotating drum mixer, is usually sufficient to prepare the pre-mix.

The second step in our process is essential only when the moisture content of the polymer-pigment mix from step 1 exceeds 35%, but is advantageous wherever this moisture content exceeds 5% and is especially advantageous when the moisture content exceeds 20%. The step, when employed, is carried out in equipment which serves the two-fold purpose of further fixing the pigment on the polymer, by gentle mechanical action, in addition to partially removing moisture, by vaporization only, without the loss of pigment, thereby preparing the mix for the subsequent step, hereinafter more fully described.

The above-mentioned second processing step is best accomplished in a dewatering extruder-mixer of the interrupted spiral type but may be carried out in other equipment capable of achieving the required evaporation of moisture and a relatively uniform distribution of pigment on the polymer surface by means of temperature and mechanically applied pressure under the above-noted conditions. We have obtained particularly favorable results using a dewatering extruder of the type manufactured and sold by The V. D. Anderson Co. under the trademark "Expeller" and comprising an elongated chamber in which there is a coaxially-positioned shaft carrying discontinuous worms for forcing the material under pressure through the chamber and having, as the discharge opening, an extrusion outlet provided with an adjustable cone-shaped control for regulating the size of the discharge opening. This apparatus is adapted to our process by adjusting the product discharge cone so that the internal mechanically applied pressure will be below the point at which liquid water would be "squeezed" from the mix and lost by drainage. Preferably the mechanically applied pressure is just below the point at which liquid water would be squeezed from the mix.

If liquid water were allowed to drain from the apparatus, pigment would also be lost and the desired loading in the final masterbatch would not be realized or controllable. As noted above, this is prevented through control of the applied pressure by adjusting the cone element at the discharge of the apparatus thereby restricting the annular area of the discharge. Thus, by proper adjustment of the cone, the degree of compaction of the polymer-pigment mix can be increased over that amount furnished by mechanical action alone.

As we have previously stated, it is essential to the invention that, in this step of the process, when employed, moisture be removed from the mass solely by vaporization. It is equally essential that vaporization be permitted to occur only after the pigment has been sufficiently incorporated in the polymer mass to prevent pigment from being carried-off with the expelled vapor. Preferably, the expelling of water vapor is at the point where pressure is released as the mix is discharged from the apparatus used in carrying out this second step.

It is also essential that only a partial removal of moisture be achieved by this second stage of the process, since the presence of a certain amount of moisture in the mix is required in the subsequent processing step for attaining optimum dispersion of pigment in the polymer. Preferably, the extrudate from the dewatering extruder, used in the second step, should have a moisture content of less than 20% by weight of the mix but under on conditions should the moisture content of the extrudate be less than 5%.

The temperature of the mix within the apparatus is not particularly critical so long as it is below that at which the polymer would be deleteriously affected and sufficient heat is present to cause elimination, by vaporization, of the desired amount of water, either while within the appaartus or upon discharge therefrom. Usually, the mixture will be charged to the apparatus at a temperature not exceeding 100° F. and the discharge temperature, which is a function of the discharge pressure setting, pigment loading and moisture content of the mixture, will usually not exceed about 250° F.

As we have previously noted, the pre-mix obtained from step 1 may be fed directly to the mastication drying step, more fully described below, without processing in the dewatering extruder of the second step, provided the moisture content, by weight of the mix, does not exceed about 35%, or preferably does not exceed about 20%.

This final step in the integrated process of our invention comprises the operations of polymer mastication and drying and is preferably carried out in apparatus which will subject the polymer-pigment mix to high shear mixing while preventing the loss of residual moisture from the mix until the product is extruded through dies at the discharge end.

One particularly effective apparatus for use in carrying out this step is that marketed under the trade name "Expander-Dryer," a product of The V. D. Anderson Company, although it will be clear to one skilled in the art that equivalent apparatus adapted to subject the mix to the above-mentioned treatment may be employed.

This apparatus just identified also comprises an elongated chamber having a feed hopper positioned at one end and an adjustable extrusion outlet positioned at the other end and a coaxially-positioned, discontinuous worm extending through the chamber for advancing the mix under pressure toward the extrusion outlet while subjecting the mix to high-shear mixing. In operation, the temperature of the material within the apparatus will exceed the vaporization point of water, but the mechanical pressure exerted on the mixture is sufficiently great to prevent vaporization of occluded water and consequently the water is maintained in the liquid state throughout the mastication, but is vaporized from the mixture as the mixture passes from the extrusion outlet.

The extrudate from the dewatering extruder of the second step or, under conditions previously noted, the pre-mix from step 1, is fed into the barrel of the extrusion apparatus where it is picked up and advanced by the series of discontinuous worms. As previously noted, the worm arrangement is designed so that the mechanical pressure imposed upon the mix is always greater than the steam pressure generated by the moisture in the mix. As a result, the moisture is maintained in the liquid state along the length of the barrel and is not removed by drainage or permitted to escape as vapor during the passage of the mix through the apparatus.

As in the previous step, we have found that it is essential that moisture be expelled solely by vaporization, preferably as the product is discharged from the apparatus. In the present step, vaporization of moisture only at the discharge end of the extruder is advantageous in achieving optimum incorporation of pigment by a smearing action as the masterbatch is extruded through the dies, in addition to rapidly cooling the product, thereby preventing the degradation of certain heat-sensitive polymers which tend to depolymerize, or otherwise degrade, if allowed to remain for a prolonged period of time at the relatively high temperatures developed within the apparatus.

The mastication drying step described above is decidedly more efficient in its utilization of energy than prior art methods in which the polymer is dried prior to pigment incorporation in a Banbury or the like. In the process of our invention the heat necessary to vaporize the moisture content of the mix is generated principally by the mechanical energy exerted in the masticating operation. Thus, the moisture content of the extruded masterbatch may be controlled by varying the energy used to masticate the mix. This may be accomplished by varying the discharge extrusion area or by varying the r.p.m. of the worm shaft or both. If additional energy is required for vaporization drying, a steam jacket around the extruder barrel may advantageously be used.

The temperature attained in the final extruder step is subject to considerable variation which may be effectively regulated by the above-mentioned methods. It should be in excess of 212° F. but should not be permitted to increase to that where the particular polymer being used would be deleteriously affected. However, the heat content in the mixture should be sufficient to cause adequate vaporization of moisture as the mixture passes from the extruder to result in a masterbatch dried to a commercial useable level. In the case of carbon black-rubber masterbatches, the acceptable moisture content is usually less than 1% and preferably less than 0.5%.

It will be recognized that the heat sensitivities of various known polymers adapted for use in our present process vary over a considerable range and the maximum permissible temperatures must be controlled accordingly. In using butyl rubber, for instance, we have, with advantage, employed temperatures within the extruder ranging as high as 400° F.

Another marked advantage of our process over conventional dry mixing methods is its applicability to continuous operation. Thus, with the present process, production rates are higher and operating costs are lower than with previous techniques.

Any polymer which can be produced as a wet crumb may be used in accordance with our process, including natural rubber and synthetic rubbers such as copolymers of butadiene-styrene, butyl rubber copolymers (e.g., copolymers of isobutylene-isoprene) and their halogenated derivatives, polymers of isoprene, polymers of butadiene, copolymers of ethylene-propylene and copolymers of butadiene-acrylonitrile. Mixtures of such polymers may also be employed. As we have previously noted, the main requirements are that the polymer crumb be of the herein specified size and moisture content.

Reinforcing pigments such as carbon black and silica can be successfully dispersed in the rubber polymer by our process to prepare a masterbatch which subsequently can be formulated with other rubber compounding ingredients. However, if desired, the rubber compounding ingredients such as accelerators, antioxidants, small amounts of processing oils, etc., may be admixed with the rubber and reinforcing pigment during the process, preferably during the premixing stage thereof.

The selection of reinforcing pigment will, to a large extent, depend on the end use of the rubber product. Presently, carbon black, particularly the type known as furnace carbon black, is the most widely used reinforcing agent in rubber. However, it is not intended to limit the invention in any way thereto since other types of carbon black, for instance channel blacks and thermal blacks may be advantageously dispersed in rubber by our process. In addition, low structure furnace carbon blacks, produced by known modifications of the furnace process or by subjecting a high structure furnace black to known mechanical treatment whereby the black is subjected to a severe shearing or impact action, may be incorporated into rubber using our process.

These low structure carbon blacks, while capable of imparting very favorable characteristics to rubber, are extremely difficult to disperse in rubber, especially butyl rubber, by conventional dry-mixing techniques. For example, low structure carbon blacks produced by subjecting a high structure black to a severe shearing and impact action cannot be satisfactorily dispersed in butyl rubber in a Banbury mill. However, the present invention offers an effective and economic method of incorporating these carbon blacks in butyl rubber.

The amount of pigment which can be agglutinated with rubber by our process may range as high as 150 parts per 100 parts of rubber, dry weight basis. However, in the case of carbon black-rubber compositions suitable for tire treads, the preferred proportion of carbon black is usually within the range of 30 to 80 phr.

The scope of our invention is defined by the claims appended hereto, but several practical applications of our process will be shown in the following specific example, which will be understood to be illustrative only and in no way restrictive of the invention.

*Example I*

In this operation, a carbon black-butyl rubber masterbatch comprising 100 parts of carbon black per 100 parts of butyl rubber, dry weight basis, was prepared. The butyl rubber used was a copolymer of isobutylene and isoprene having a Mooney viscosity of 71+ (8 minutes at 212° F.) and about 1.4 mole percent unsaturation, marketed under the trade name "Enjay Butyl 218."

Preceding the operation, the wet butyl crumb was drained to remove free water by passing the raw material over a shaker screen. The moisture content of the drained crumb was found to be 44%, by weight. Crumb particles within the 8 mesh to 325 mesh range were selected for the preparation of the masterbatch since the desired carbon black loading was 100 phr.

Measured amounts of the wet crumb and dry carbon black were charged into a rotating drum mixer, provided with flights, and mixed therein for a period of 15 minutes to obtain an over-all distribution of the carbon black on the surface of the polymer crumb.

The carbon black-butyl rubber premix, having a moisture content of 28%, by weight of the mix, was then fed to a dewatering extruder, specifically a pilot plant model of the above-described "Expeller," for the second processing step. The premix was conveyed by a feed worm into the upstream end of the chamber housing the compression worms which gently sheared and compacted the mix, and advanced it through the chamber. In this pilot plant model the chamber was 6 inches in diameter and 22 inches in length and the compression means consisted of a series of discontinuous worms cooperating with collars and knife bar lugs between each of the worm segments. The cone element at the discharge of the apparatus, as previously described, was adjusted to restrict the annular area of the discharge opening so that the internal pressure of the unit was just below the point at which liquid water would be "squeezed" from the mix. If moisture were permitted to be removed in this manner, carbon black would also be lost and the desired pigment loading in the final masterbatch would not be realized. However, some moisture was removed by vaporization as the mix was extruded between the discharge casting of the apparatus and the cone element.

The mixture was fed to the dewatering extruder at a temperature of 80° F., its moisture content being about 28%. The residence time in the extrude was approximately 45 seconds, and the mixture extruded therefrom was at a temperaturer of 180° F. and had a moisture content of 19.2% by weight. The extrudate was thus produced at a rate of 47 pounds per hp. hour.

The extrudate from the step just described was fed to the final step of the process, which was carried out in a pilot plant model of the "Expander-Dryer" previously described, for further mastication and drying. This apparatus, as previously described, comprised a series of discontinuous worms rotating within a chamber 6 feet long and 4 inches inside diameter, provided with a heat-exchange jacket.

The worm arrangement and the discharge opening of this apparatus were so designed that the mechanical pressure imposed upon the mix was greater than the steam pressure generated by the moisture of the mix, at the prevailing temperature, thereby holding the water in a liquid state along the entire length of the apparatus, the moisture being vaporized and separated from the mix only as it passes from the extruder outlet. The extent of the drying, therefore, depends upon the temperature of the mix prior to being extruded, which, in turn, is controlled largely by the amount of energy used in masticating the mix.

In this operation, the worm was rotated at a constant rate of 210 r.p.m. and the extrusion area at the outlet of the chamber was so adjusted, in conjunction with the temperature of the water passed through the heat-exchange jacket that, upon passing from the extruder, most of the water in the mixture was vaporized, leaving a moisture content of only 0.5% by weight.

The masticating time of the mixture was approximately 30 seconds and during this period the temperature of the mixture, entering at 180° F., rose to 330–370° F. The temperature of the mixture extruded therefrom was 200° F. and the production rate of the masterbatch was 29.4 pounds per horsepower hour.

The resultant masterbatch was tested for carbon black dispersion rating by the light microscope method described by William M. Hess in an article entitled, "New Techniques for Evaluating Pigment Dispersions in Rubber," published in Rubber World, New York, volume 145, No. 2, beginning on page 78, and No. 3, beginning on page 80, for November 1961 and December 1961, respectively. In this technique the percentage of carbon black particles below 9 microns, dispersed in the rubber is determined. The dispersion rating of this masterbatch prepared by the process of our invention was found to be 98%, while that of a control masterbatch prepared from the identical carbon black and butyl rubber by conventional Banbury mixing was only 60%.

In order to illustrate the significance of the characteristic differences between the masterbatch prepared in accordance with the present invention and that prepared by conventional dry mixing, each of the masterbatches was further compounded for vulcanization by incorporating therein known compounding ingredients, in accordance with the recipe tabulated below in Table 2, by Banbury mixing, and each of the resulting compositions was cured and tested under identical conditions, the results of which tests are set forth in the following Table 3:

TABLE 2

| Recipe employed: | Parts (by weight) |
|---|---|
| Butyl rubber | 100.00 |
| Carbon black | 50.00 |
| Stearic acid | 1.00 |
| Zinc oxide | 5.00 |
| Necton 60 [1] | 5.00 |
| Elastopar [2] | 0.25 |
| Altax [3] | 1.00 |
| Tuads [4] | 1.00 |
| Sulfur | 1.00 |

[1] Non-staining extracted naphthenic oil manufactured by Humble Oil and Refining Company.
[2] N-methyl-N, 4-dinitrosoaniline on inert carrier manufactured by Monsanto Chemical Company.
[3] 2,2'-benzothiazyl disulfide manufactured by R. T. Vanderbilt Company.
[4] Tetramethylthiuram disulfide manufactured by R. T. Vanderbilt Company.

TABLE 3

| Process | Dry-Mixed Control | Present Invention |
|---|---|---|
| Rubber Physicals Cured at 290° F.: | | |
| 20 minute cure— | | |
| Tensile | 2,400 | 2,770 |
| L300 | 350 | 520 |
| 60 minute cure— | | |
| Tensile | 2,690 | 3,080 |
| L300 | 880 | 1,050 |
| Elongation | 655 | 630 |
| Shore Hardness | 55 | 60 |
| Maximum Tensile | 2,690 | 3,080 |

From the foregoing test results, it is apparent that the vulcanized rubber composition prepared from the masterbatch produced in accordance with the present invention was markedly superior to that prepared from the masterbatch produced by conventional dry-mixing.

We claim:
1. A process for dispersing particulate rubber reinforcing pigments in an elastomer comprising the steps of preliminarily mixing the particulate pigments with the elastomer in the form of a wet crumb having an occluded moisture content ranging from about 10% to about 65%, by weight and particle size within the range from 2.5 to 325 mesh, and thereafter masticating the mix while it contains at least 5%, but not exceeding 35%, moisture by weight, in a closed chamber at an elevated temperature in excess of 212° F. but below that at which the polymer is degraded and under a pressure adapted to retain the moisture in the mix during the mastication, and extruding the masticated mix from the chamber and eliminating water from the mix solely as water vapor as the mix passes from the extruder.

2. The process of claim 1 in which the pigment is preliminarily mixed with the wet crumb by tumbling the two together to form an adhering coating of the pigment on the wet crumb particles.

3. The process of claim 1 in which the pigment is preliminarily mixed with the wet crumb to form an overall distribution of the pigment adhering to the surface of the wet crumb, the resultant mix having a moisture content exceeding 5% by weight but not exceeding 50% by weight, and subjecting the mix, prior to the mastication step, to a mechanical compacting under conditions of temperature and pressure adapted to effect elimination of moisture therefrom, solely as vapor, to reduce the moisture content to not less than 5% by weight, but not exceeding 35% by weight.

4. The process of claim 3 in which the compacting step is carried out by mechanical mixing in a closed chamber and extruding the mix from the chamber, the mix within the chamber being maintained under mechanically applied pressure below that at which water would be squeezed from the mix and the mix is thereafter extruded under conditions permitting the elimination of water solely as water vapor as the mix passes from the extruder.

5. The process of claim 1 in which the pigment loading is within the range of 100–150 phr. and the crumb size is within the range from 8 to 325 mesh.

6. The process of claim 1 in which the pigment is carbon black.

7. The process of claim 1 in which the pigment is silica.

8. The process of claim 1 in which the pigment is carbon black and the elastomer is a copolymer of isobutylene and isoprene.

9. The process of claim 3 in which the moisture content of the mix charged to the masticating step is within the range from about 5% to about 20%.

10. The process of claim 1 in which the moisture content of the extrudate from the masticating step is less than 1%.

References Cited by the Examiner

UNITED STATES PATENTS

| 2,089,809 | 8/37 | Penning | 260—763 |
| 2,820,837 | 1/58 | Smith | 260—763 |
| 2,935,763 | 5/60 | Newman et al. | 260—41.5 |

MORRIS LIEBMAN, *Primary Examiner.*

UNITED STATES PATENT OFFICE
CERTIFICATE OF CORRECTION

Patent No. 3,178,390　　　　　　　　　　　　April 13, 1965

Richard S. Reed et al.

It is hereby certified that error appears in the above numbered patent requiring correction and that the said Letters Patent should read as corrected below.

Column 3, line 61, for "on" read -- no --; line 69, for "appaartus" read -- apparatus --; column 6, line 46, for "extrude" read -- extruder --.

Signed and sealed this 28th day of September 1965.

(SEAL)
Attest:

ERNEST W. SWIDER　　　　　　　　　　　　EDWARD J. BRENNER
Attesting Officer　　　　　　　　　　　　　Commissioner of Patents